United States Patent
El-Berrichi

(10) Patent No.: US 8,376,010 B2
(45) Date of Patent: Feb. 19, 2013

(54) TIRE FOR HEAVY VEHICLES

(75) Inventor: Reda El-Berrichi, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 575 days.

(21) Appl. No.: 12/520,859

(22) PCT Filed: Nov. 14, 2007

(86) PCT No.: PCT/EP2007/062314
§ 371 (c)(1),
(2), (4) Date: Jun. 22, 2009

(87) PCT Pub. No.: WO2008/080684
PCT Pub. Date: Jul. 10, 2008

(65) Prior Publication Data
US 2009/0288752 A1    Nov. 26, 2009

(30) Foreign Application Priority Data

Dec. 21, 2006  (FR) ...................................... 06 11394

(51) Int. Cl.
*B60C 9/22* (2006.01)
*B60C 9/08* (2006.01)

(52) U.S. Cl. .......................... 152/531; 152/526; 152/560

(58) Field of Classification Search .................. 152/531, 152/526, 535; *B60C 9/18, 9/20, 9/22*
See application file for complete search history.

(56) References Cited

U.S. PATENT DOCUMENTS 3,677,319 A * 7/1972 Mirtain ........................ 152/527
2004/0026000 A1 * 2/2004 Shimizu ....................... 152/527

FOREIGN PATENT DOCUMENTS

JP   10 250313    9/1998
JP   11 115412    4/1999

OTHER PUBLICATIONS

English Language Machine Translation of JP10-250313, 1998.*
English Language Machine Translation of JP11-115412, 1999.*
Patent Abstracts of Japan JP10-250313, 1998.*

* cited by examiner

*Primary Examiner* — Justin Fischer
*Assistant Examiner* — Philip N Schwartz
(74) *Attorney, Agent, or Firm* — Cozen O'Connor

(57) ABSTRACT

A tire for a heavy vehicle with a radial carcass reinforcement of a width in excess of 25 inches comprising at least a working crown reinforcement made up of at least one layer of reinforcing elements oriented substantially circumferentially, radially surmounted by at least two so-called working layers axially wider than the layer of substantially circumferentially oriented reinforcing elements. Each of the working layers is made up of at least two axially separated parts, the distance between the axially inner end of each of the axially outer parts of at least the radially innermost working layer and the end of the radially outermost layer of substantially circumferentially oriented reinforcing elements being less than 45 mm and the gap, in the axial direction, between two parts of each of the working crown layers being greater than 5 mm.

10 Claims, 5 Drawing Sheets

TIRE FOR HEAVY VEHICLES

RELATED APPLICATIONS

This is a U.S. National Phase Application under 35 USC 371 of International Application PCT/EP2007/062314, filed on Nov. 14, 2007.

This application claims the priority of French patent application no. 06/11394 filed Dec. 21, 2006, the subject matter of which is hereby incorporated by reference.

FIELD OF THE INVENTION

The present invention relates to a tire intended to be fitted to a heavy vehicle or piece of heavy construction machinery, the said tire comprising at least one radial carcass reinforcement radially surmounted by a tread and having an axial width in excess of 25 inches.

BACKGROUND OF THE INVENTION

Although not restricted to this type of application, the invention will be more specifically described with reference to tires for vehicles of the loader type working in mines and with an axial width in excess of 37 inches. This type of loader is used in mines to fill the skips of vehicles of the dump truck type.

The reinforcing structure or reinforcement of tires, particularly of construction vehicle tires is currently—and usually—made up of a stack of one or more plies conventionally known as "carcass plies", "crown plies", etc. This way of naming the reinforcement stems from the method of manufacture which involves producing a series of semi-finished products in the form of plies, provided with thread-like reinforcements, often longitudinal, which are then assembled or stacked in order to build a green tire. The plies are produced flat, with substantial dimensions, and are then cut to the dimensions of a given product. The plies are also initially assembled substantially flat. The green tire thus produced is then shaped to adopt the toroidal profile typical of tires. The semi-finished "finishing" products are then applied to the green tire to obtain a product ready to be cured.

A "conventional" type of method such as this involves, particularly during the phase of manufacturing the green tire, the use of an anchoring element (generally a bead wire), which is used to anchor or retain the carcass reinforcement in the bead region of the tire. Thus, for this type of method, a portion of all the plies that make up the carcass reinforcement (or just some of them) are folded back around a bead wire positioned in the bead of the tire. That then anchors the carcass reinforcement in the bead.

The widespread use across industry of this conventional type of method, in spite of there being numerous variations in how the plies are created and assembled, has led those skilled in the art to adopt a vocabulary based on the method; hence the terminology generally used, involving in particular the terms "plies", "carcass", "bead wire", "shaping" to denote the transition from a flat profile to a toroidal profile, etc.

Nowadays there are tires which do not strictly speaking have "plies" or "bead wires" as understood from the above definitions. For example, document EP 0 582 196 describes tires manufactured without the aid of semi-finished products in the form of plies. For example, the reinforcing elements of the various reinforcing structures are applied directly to the adjacent layers of rubber compounds, everything being applied in successive layers to a toroidal core, the shape of which directly yields a profile similar to the final profile of the tire that is in the process of being manufactured. Thus, in that case, there are no longer any "semi-finished" products or "plies" or "bead wires". The basic products such as the rubber compounds and the reinforcing elements in the form of threads or filaments are applied directly to the core. As this core is of a toroidal shape, there is no longer any need to form the green tire in order to change from a flat profile to a profile in the form of a torus.

There are also methods of assembly on the toroidal core that employ semi-finished products specially designed for rapid, effective and simple lying onto a central core. Finally, it is also possible to use a hybrid comprising both certain semi-finished products for achieving certain architectural aspects (such as plies, bead wires, etc.), while others are created by applying reinforcing elements and/or compounds directly.

In this document, in order to take account of recent technological advances both in the field of manufacture and in the design of the products, the conventional terms such as "plies", "bead wires", etc. are advantageously replaced by terms which are neutral or independent of the type of method used. Hence, the term "carcass type reinforcement" or "sidewall reinforcement" can validly be used to denote the reinforcing elements of a carcass ply in the conventional method, and the corresponding reinforcing elements, generally applied to the sidewalls, of a tire produced according to a method that does not involve semi-finished products. The term "anchoring zone", for its part, can just as easily denote the "traditional" turning back of the carcass ply around a bead wire in a conventional method as it can the assembly formed by the circumferential reinforcing elements, the rubber compound and the adjacent sidewall reinforcing portions of a bottom region created using a method which involves applying elements to a toroidal core.

As far as the usual design of tires for construction plants is concerned, the radial carcass reinforcement anchored in each bead is made up of at least one layer of metal reinforcing elements, the said elements being substantially mutually parallel within the layer. The carcass reinforcement is usually surmounted by a crown reinforcement made up of at least two working crown layers of metal reinforcing elements, but which are crossed from one layer to the next, making angles of between 15 and 70° with the circumferential direction. Between the carcass reinforcement and the working crown layers there are usually two layers of reinforcing elements, crossed from one layer to the next, and at angles of less than 12°; the width of these layers of reinforcing elements is usually less than that of the working layers. Radially on the outside of the working layers there are then protective layers, the reinforcing elements of which are at angles of between 10 and 65°. The crown reinforcement is itself surmounted by a tread.

The term "axial" means a direction parallel to the axis of rotation of the tire and the term "radial" means a direction intersecting the axis of rotation of the tire which is perpendicular thereto. The axis of rotation of the tire is the axis about which it rotates in normal use.

A circumferential plane or circumferential plane of section is a plane perpendicular to the axis of rotation of the tire. The equatorial plane or circumferential mid-plane is the circumferential plane that passes through the centre or crown of the tread and which divides the tire into two halves.

A radial plane is a plane which contains the axis of rotation of the tire.

The longitudinal direction of the tire, or circumferential direction, is the direction corresponding to the periphery of the tire and defined by the direction in which the tire runs.

Construction plant tires like those described hereinabove are usually subjected to a pressure of between 4 and 10 bars for normal sizes and loads.

In the case of tires for loaders as described hereinabove, the crown reinforcement of the tire is special in so far as the said loaders are articulated vehicles which may be fitted with tires with very low cornering rigidity. The crown reinforcements thus defined for this type of tire, which in particular have working layers, the reinforcing elements of which make angles in excess of 45° with the circumferential direction, are particularly advantageous in terms of tire wear for the uses associated with this type of vehicle.

By contrast, under particularly harsh conditions of use of these tires, the latter may suffer damage to the working layers of the crown reinforcement in the zones at the ends of the layers of reinforcing elements at angles smaller than 12°.

SUMMARY OF THE INVENTION

One object of the present invention is to provide tires with satisfactory properties particularly in terms of wear and which do not display damage to the working layers whatever the conditions in which the said tires are used.

This object is attained in accordance with one aspect of the present invention directed to a tire for a heavy vehicle with a radial carcass reinforcement of a width in excess of 25 inches comprising a crown reinforcement radially inserted between the carcass reinforcement and the tread, the crown reinforcement being made up of at least one working crown reinforcement made up of at least one layer of reinforcing elements oriented substantially circumferentially, radially surmounted by at least two so-called working layers, the reinforcing elements of which make an angle of between 15 and 70° with the circumferential direction, are mutually parallel within each layer and are crossed from one layer to the next, the two working layers being axially wider than the layer of substantially circumferentially oriented reinforcing elements, each of the working layers being made up of at least two axially separated parts, the distance between the axially inner end of each of the axially outer parts of at least the radially innermost working layer and the end of the radially outermost layer of substantially circumferentially oriented reinforcing elements being less than 45 mm and the gap, in the axial direction, between two parts of each of the working crown layers being greater than 5 mm and preferably greater than 15 mm.

Advantageously, the substantially circumferentially oriented reinforcing elements make an angle of less than 12° with the circumferential direction.

According to a preferred embodiment of the invention, the distance between the axially inner end of each of the axially outer parts of at least the radially innermost working layer and the end of the layer of substantially circumferentially oriented reinforcing elements is less than 25 mm and preferably less than 10 mm.

The tire thus described comprises working layers which have at least one discontinuity in the axial direction, the said discontinuity lying near the end of a layer of substantially circumferentially oriented reinforcing elements; the distance between the axially inner end of each of the axially outer parts of at least the radially innermost working layer and the end of the radially outermost layer of substantially circumferentially oriented reinforcing elements being less than 45 mm. Furthermore, the axial break or discontinuity in a working layer is larger than 5 mm.

Tests carried out with tires thus produced fitted to a loader used under conditions particularly hard on tires have demonstrated, by comparison with reference tires of a similar architecture but without the characteristic discontinuity in the working layers, that there was no damage to the said working layers on the tire according to the invention whereas the reference tires were damaged.

The inventors believe that the interpretation of these results lies in the limitation placed on the compressive stresses in the reinforcing elements of the working layers that may arise during running. The breaks in the said working layers actually appear to limit this compression of the reinforcing elements, at least in the sensitive zones.

As a preference, according to the invention, the working crown reinforcement comprises two layers of substantially circumferentially oriented reinforcing elements.

Again as a preference, according to the invention, the reinforcing elements of the working layers are at an angle greater than 45°. Such angles of the working layers are particularly advantageous in terms of the tire wear properties.

According to an advantageous alternative form of the invention, the axially inner end of at least an axially outer part of at least the radially innermost working layer is axially on the inside of the end of the radially outermost layer of substantially circumferentially oriented reinforcing elements. According to this alternative form of embodiment of invention, at least an axially outer part of the radially innermost working layer has a zone of axial overlap with the layer of substantially circumferentially oriented reinforcing elements radially adjacent to it. Such a configuration of crown architecture may, for certain types of tire use, lead to better results in terms of tire wear and endurance by better distributing the stresses between the various layers that make up the crown reinforcement.

According to other alternative forms of embodiment of the invention, the axially inner end of at least an axially outer part of at least the radially innermost working layer is axially on the outside of the end of at least the radially outermost layer of substantially circumferentially oriented reinforcing elements. According to some of these alternative forms of embodiment of the invention, the axially inner layer of at least an axially outer part of at least the radially innermost working layer is axially on the outside of the ends of each of the layers of substantially circumferentially oriented reinforcing elements; the axially inner ends of at least an axially outer part of at least the said working layer are then advantageously axially on the inside of the ends of at least one protective ply that will be discussed in greater detail later.

One embodiment of the invention is for the axially inner ends of the axially outer parts of the two working layers to be contiguous. According to this embodiment of the invention, the two working layers are axially interrupted at the same position. An embodiment such as this may, in particular, make the method of manufacture easier.

Another embodiment of the invention, which is advantageous particularly in terms of the mechanical operation of the tire, is for the axially inner ends of the axially outer parts of the two working layers not to be contiguous and therefore to be axially offset.

Advantageously again according to the invention, the axial lengths of the breaks are identical for both working layers, particularly when the ends are contiguous. Nonetheless, according to certain configurations particularly dependent on how the various crown layers are arranged, the invention does provide for the breaks to be able to have axial widths that vary from one layer to another.

A first alternative form of the invention is for at least one of the working layers to be made up of two axially separated parts. According to this first alternative is form of embodiment of the invention, the working layers are made up of two axially outer parts axially separated from one another over a relatively large distance at least equal to the axial width of the layer of substantially circumferentially oriented reinforcing elements minus 90 mm and preferably minus 50 mm and more preferably still minus 20 mm.

An alternative form of embodiment of the invention such as this will in particular make it possible to decrease the rigidities at the centre of the tire tread. Advantageously also, each of the working layers are made up of two axially separated parts.

A second alternative form of the invention is for at least one of the working layers to be made up of three axially separated parts and therefore for there to be two axial zones of discontinuity within each of the working layers. An alternative form of embodiment such as this leads to a result similar to that of the first alternative form, the working layers still being present under the central part of the tread.

According to this second alternative form of embodiment of the invention, the angles made by the reinforcing elements with the circumferential direction may be the same in the three parts of one and the same working layer or alternatively may differ and in particular may be identical in the two axial parts and different in the central part by comparison with these axial parts. Advantageously again, each of the working layers is made up of three axially separated parts.

According to either one of these alternative forms of embodiment of the invention, the tests carried out have demonstrated that the tires according to the invention are able to run over longer distances in particularly harsh conditions without any damage appearing at the working layers as does occur when traditional tires are used in the same running conditions.

According to a preferred embodiment of the invention, the radially innermost working layer is axially the widest.

In a way known per se, particularly in order to improve the resistance of the tire to cutting and puncturing, the working crown reinforcement is supplemented by a protective reinforcement comprising at least one protective layer.

Preferably also, the crown reinforcement comprises at least two elastic metal protective layers, and the radially innermost protective layer is axially the widest.

Advantageously according to the invention, the protective layers have widths less than the widths of the working layers.

Preferably also, the reinforcing elements of the protective layers cross one another.

Alternative forms of embodiment of the invention include protective layers consisting of partially overlapping chafers. Whatever the type of protective layer used, the elastic reinforcements used may be elements arranged in a straight line or in a sinusoidal path.

BRIEF DESCRIPTION OF THE DRAWINGS

Other details and advantageous features of the invention will become apparent herein below from the description of some exemplary embodiments of the invention given with reference to FIGS. 1 to 5 which depict.

DETAILED DESCRIPTION OF THE DRAWINGS

For ease of understanding, the figures are not drawn to scale. The figures depict only a half view of the tire which extends symmetrically with respect to the axis XX' which represents the circumferential mid-plane or equatorial plane, of a tire.

Figure 1:
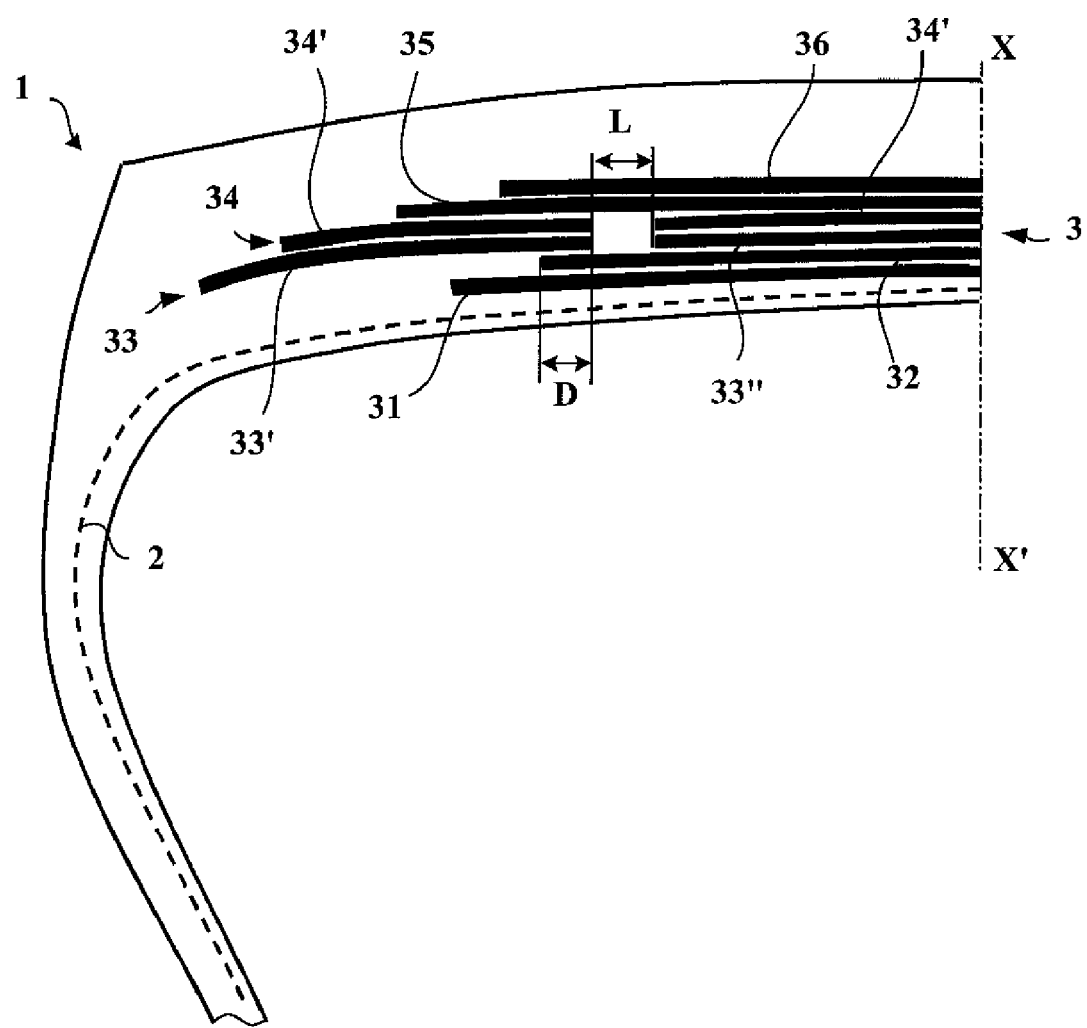
FIG. 1: a schematic depiction of a tire according to a first embodiment of the invention.

FIG. 1 is a diagram in radial section through a tire 1 produced according to the invention. The tire 1, of size $^{45}\!/_{65}$ R 45, comprises a carcass reinforcement 2 anchored in two beads, not depicted in the drawing. This carcass reinforcement 2 is hooped by a crown reinforcement 3, formed radially from the inside outwards:

of a first layer 31 formed of inextensible metal cords oriented at an angle of 5° with respect to the circumferential direction;

of a second layer 32 formed of inextensible metal cords oriented at an angle of 5° with respect to the circumferential direction and crossing with the metal cords of the layer 31; the layer 32 being axially shorter than the layer 31;

of a working layer 33 formed of metal cords oriented at an angle of 60° with respect to the circumferential direction and crossing with the metal cords of the layer 32. The working layer 33 is interrupted and formed of three parts (only two of which are visible in the figure), two axially outer parts 33' and a central part 33". The width L of the break in the layer 33, that is to say the distance in the axial direction between the ends of the parts 33' and 33" is equal to 30 mm. The distance D between the axially inner end of the part 33' and the end of the layer 32 is equal to 20 mm, the axially inner end of the part 33' being axially on the inside of the end of the layer 32.

of a working layer 34 formed of metal cords oriented at an angle of 60° with respect to the circumferential direction and crossing with the metal cords of the layer 33. The working layer 34 is interrupted and formed of three parts, two axially outer parts 34' and a central part 34". The layer 34 is axially interrupted like the layer 33, the axial width of the axially outer parts 34' being less than the axial width of the axially outer parts 33'.

of a protective layer 35 formed of extensile metal cords oriented at an angle of 16° with respect to the circumferential direction, crossing with the cords of the layer 34 and of an axial width less than the width of the working layer 34.

of a protective layer 36 formed of extensile metal cords oriented at an angle of 16° with respect to the circumferential direction, crossing with the cords of the layer 35 and of an axial width less than the width of the protective layer 35.

Figure 2:
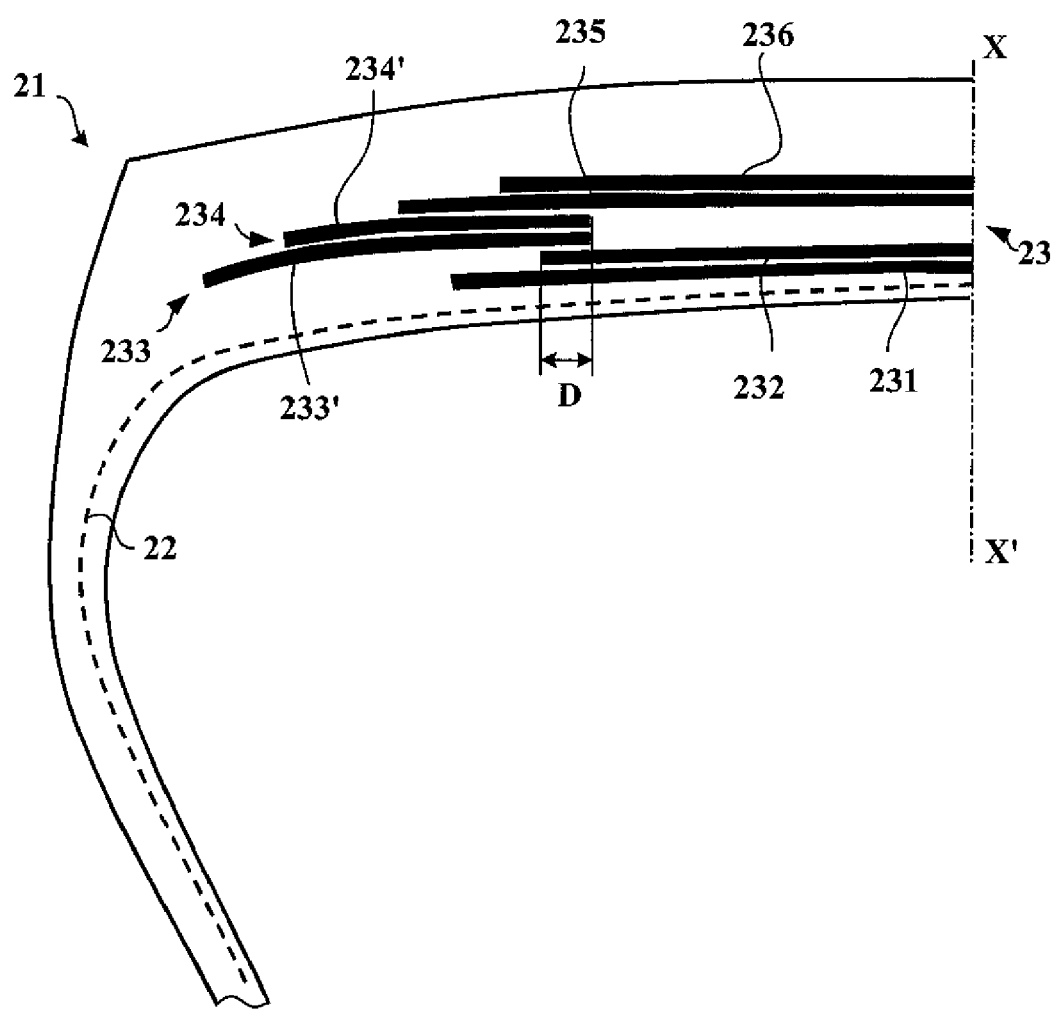
FIG. 2: a schematic depiction of a tire according to a second embodiment of the invention.

FIG. 2 illustrates a second alternative form of embodiment of the invention. The tire 21 differs from that of FIG. 1 in that the layers 233 and 234 are interrupted and each made up of two parts 233', 234', the axially inner ends of which are axially distant from the ends of the layer 232 by a distance D equal to 20 mm. In this figure, the axial distance between the ends of the two parts 233' or 234' is equal to the axial width of the layer 232 minus twice the distance D.

Figure 3:
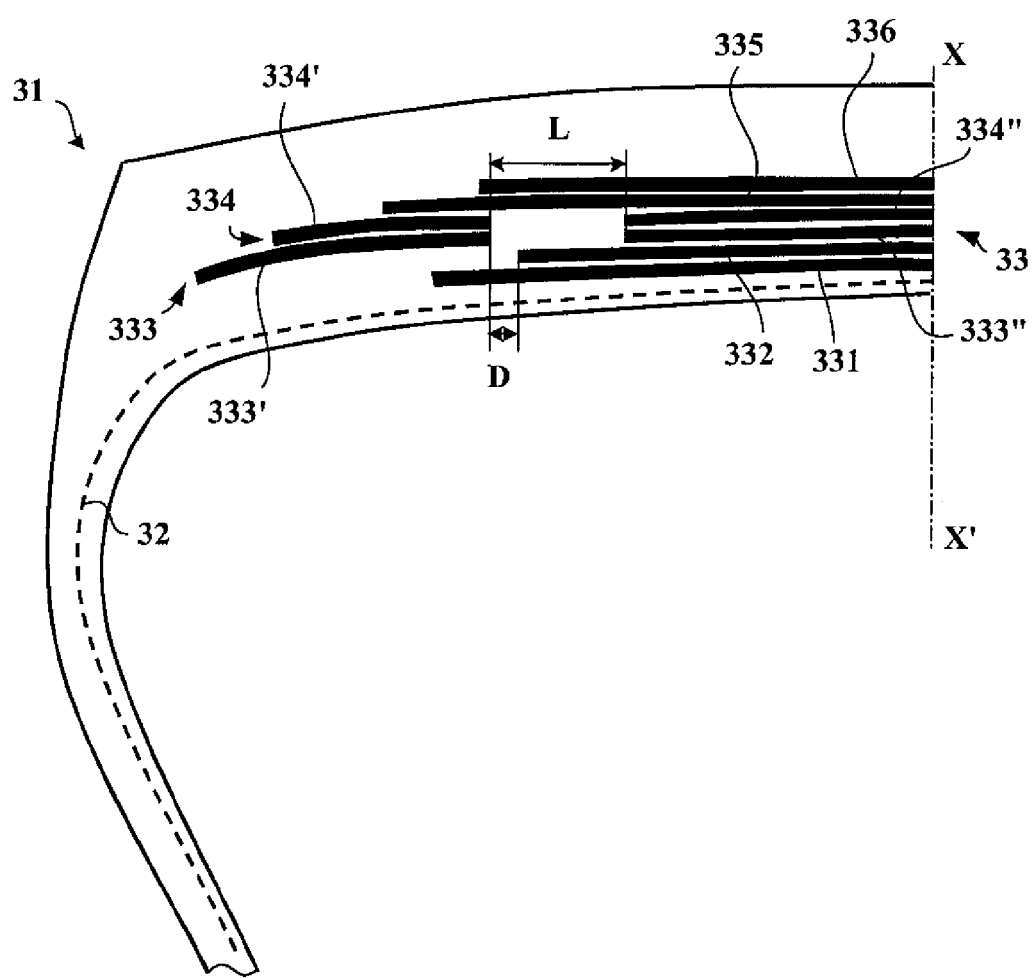
FIG. 3: a schematic depiction of a tire according to a third embodiment of the invention.

FIG. 3 illustrates a third alternative form of embodiment of the invention. The tire 31 differs from that of FIG. 1 in that the layers 333 and 334 are interrupted such that the axially inner ends of the axially outer parts 333' and 334' are axially on the outside of the end of the layer 332. In the depiction of FIG. 3, the working layers 333 and 334 are produced in three parts 333', 333" and 334' and 334", as in the case of FIG. 1. These same layers 333 and 334 could alternatively be produced in two parts as in the case of FIG. 2. The axial distance between the ends of the two parts 233' or 234' would then be equal to the axial width of the layer 232 increased by twice the distance D of 10 mm.

Figure 4:
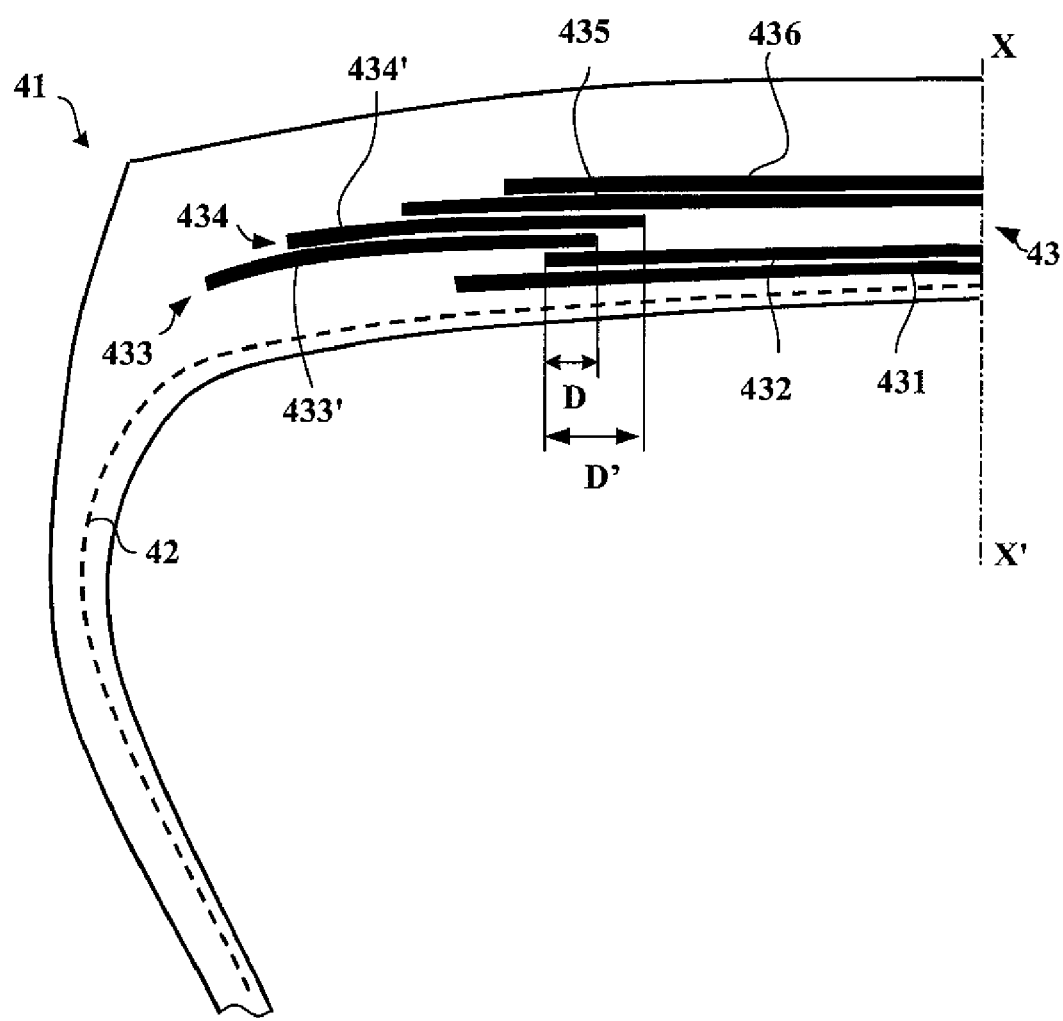
FIG. 4: a schematic depiction of a tire according to a fourth embodiment of the invention.

FIG. 4 illustrates a fourth alternative form of embodiment of the invention. The tire 41 differs from that of FIG. 1 firstly as in the case of FIG. 2 in that the layers 433 and 434 are interrupted and each made up of two parts 433', 434' and secondly in that the axially inner ends of the said layers are axially offset from one another and therefore not contiguous. The axially inner end of the part 433' is distant from the end of the layer 432 by a distance D of 20 mm. The axially inner end of the part 434' is distant from the end of the layer 432 by a distance D' equal to 50 mm. In this FIG. 4, the axial distance between the axially inner ends of the two parts 433' is equal to the axial width of the layer 432 minus twice the distance D. Likewise, the axial distance between the axially inner ends of the two parts 434' is equal to the axial width of the layer 432 minus twice the distance D'.

Figure 5:
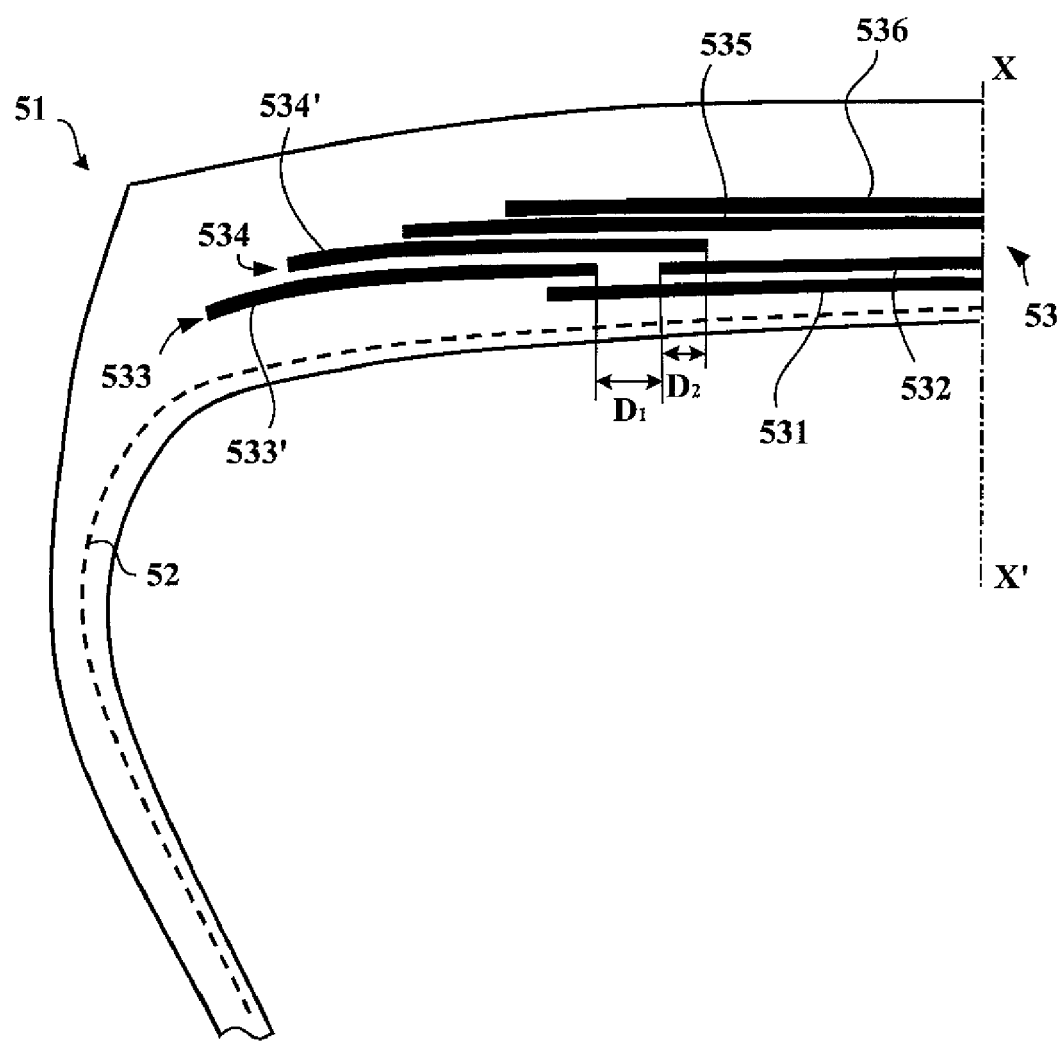
FIG. 5: a schematic depiction of a tire according to a fifth embodiment of the invention.

FIG. 5 illustrates another alternative form of embodiment of the invention. The tire 51 depicted in this FIG. 5 as before comprises two interrupted working layers 533 and 534. The working layer 534 is made up of two parts 534', of which the axially inner ends are at a distance $D_2$ from the ends of the layer 532, equal to 20 mm. The working layer 533 is also made up of two parts 533' axially separated by the layer 532, the ends of which are at a distance $D_1$ from the axially inner ends of the parts 533', equal to 20 mm.

According to this depiction of FIG. 5, the combination of the working layer 433 and of the layer 432 can be likened to a three-part layer in which the axially outer parts 433' are made up of reinforcing elements oriented at 60° and in which the central part 432 is made up of reinforcing elements oriented at 5°.

The various embodiments described in these figures should not be interpreted limitingly, other alternative forms of embodiment of the invention being of course achievable.

First of all, in the examples, the angles of the reinforcing elements of the various layers of crown reinforcement have been considered always to be the same. Clearly these angles could differ; the angles of the reinforcing elements of the working layers could, for example, be chosen to be smaller when, in particular, the working layers are produced in two parts.

In particular it is also possible to conceive of producing three-part interrupted working layers in which the angles of the reinforcing elements are not identical; for example, the central part could have reinforcing elements at smaller angles than the axially outer parts, these angles for example being similar to those of the protective layers.

A tire produced in accordance with the invention was tested on a vehicle of the CAT 992G loader type.

Comparative tests were performed on the basis of the tire depicted in FIG. 4. The comparison was made with an identical reference tire having similar crown architecture except that the working layers were not interrupted.

The tires were tested on the same vehicle, this vehicle following the same route simulating a path very hard on tires and driven by the same driver. The path, which modeled the use of a loader with its skip full, in particular comprised phases over short distances of driving forwards and backwards, forward and backward starts imposing the transmission of significant amounts of torque from a zero speed, and phases of driving over longer distances including bends.

The tests confirmed, after 300 hours of running, that the tires according to the invention displayed no damage whereas the reference tires were showing signs of damage to the working plies in the zones at the ends of the plies of substantially circumferentially directed reinforcing elements.

The invention claimed is:

1. A tire for a heavy vehicle with a radial carcass reinforcement of a width in excess of 25 inches comprising a crown reinforcement radially inserted between the carcass reinforcement and the tread, said crown reinforcement being made up of at least one working crown reinforcement made up of at least one layer of reinforcing elements oriented substantially circumferentially, radially surmounted by at least two so-called working layers, the reinforcing elements of which make an angle of between 15 and 70° with the circumferential direction, are mutually parallel within each layer and are crossed from one layer to the next, said two working layers being axially wider than the layer of substantially circumferentially oriented reinforcing elements, wherein each of said working layers comprises two axially separated parts, wherein the distance between an axially inner end of each of axially outer parts of at least the radially innermost working layer and an end of the radially outermost layer of substantially circumferentially oriented reinforcing elements is less than 45 mm and wherein the gap, in the axial direction, between two parts of each of the working crown layers is greater than 5 mm.

2. The tire according to claim 1, wherein the substantially circumferentially oriented reinforcing elements make an angle of less than 12° with the circumferential direction.

3. The tire according to claim 1, wherein the reinforcing elements of the working layers are at an angle greater than 45°.

4. The tire according to claim 1, wherein at least the axially inner end of an axially outer part of at least the radially innermost working layer is axially on the inside of the end of the radially outermost layer of substantially circumferentially oriented reinforcing elements.

5. The tire according to claim 1, wherein at least the axially inner end of an axially outer part of at least the radially innermost working layer is axially on the outside of the end of at least the radially outermost layer of substantially circumferentially oriented reinforcing elements.

6. The tire according to claim 1, wherein the axially inner ends of the axially outer parts of the two working layers are not axially contiguous.

7. The tire according to claim 1, wherein at least one of the working layers is made up of two axially separated parts.

8. The tire according to claim 1, wherein the radially innermost working layer is axially the widest.

9. The tire according to claim 1, wherein the crown reinforcement comprises at least one protective layer.

10. The tire according to claim 8, wherein the crown reinforcement comprises at least two protective layers and in that the radially innermost protective layer is axially the widest.

* * * * *